(12) United States Patent
Fox et al.

(10) Patent No.: US 6,527,317 B2
(45) Date of Patent: Mar. 4, 2003

(54) MOTOR VEHICLE FRONT END

(75) Inventors: Peter Fox, Weil der Stadt (DE); Hans-Peter Maier, Nagold (DE); Peter Raim, Rodgau (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/810,417

(22) Filed: Mar. 19, 2001

(65) Prior Publication Data

US 2001/0038213 A1 Nov. 8, 2001

(30) Foreign Application Priority Data

Mar. 17, 2000 (DE) ......................................... 100 134 27

(51) Int. Cl.⁷ .............................................. B62D 25/08
(52) U.S. Cl. ...................................... 293/115; 180/68.6
(58) Field of Search ................................ 293/115, 132; 180/68.6; 296/194

(56) References Cited

U.S. PATENT DOCUMENTS

| | | | |
|---|---|---|---|
| 3,792,889 A | * | 2/1974 | Fuener et al. |
| 4,753,468 A | * | 6/1988 | Szymcak et al. ........... 293/132 |
| 4,834,436 A | * | 5/1989 | Nguyen ...................... 293/115 |
| 4,944,540 A | * | 7/1990 | Mansoor et al. ............ 293/115 |
| 5,503,444 A | * | 4/1996 | Rouse et al. ................ 293/115 |

FOREIGN PATENT DOCUMENTS

| | | | |
|---|---|---|---|
| DE | 2727517 | | 12/1978 |
| JP | 56-31846 | * | 3/1981 |
| JP | 58-30874 | * | 2/1983 |

* cited by examiner

*Primary Examiner*—Joseph D. Pape
(74) *Attorney, Agent, or Firm*—Crowell & Moring LLP

(57) ABSTRACT

A motor-vehicle front end having a front bumper and a front covering which is mounted behind it, the front covering being mounted pivotably on a load-bearing structural member and in a frontal impact being pivoted rearwards about an approximately horizontal vehicle transverse axis by being carried along by the bumper by the rearwards displacement of an associated region of the bumper, a support being provided between a rear supporting surface of the bumper and a mating surface of the front covering for the purpose of carrying along the said front covering. In order to be able to reduce the space required for the arrangement in the motor-vehicle front end without incurring losses in its functioning, the front covering is suspended in a pendulous manner on the load-bearing structural member at a distance above the bumper and in its lower region is fastened permanently to the supporting surface of the bumper by the mating surface.

17 Claims, 5 Drawing Sheets

MOTOR VEHICLE FRONT END

BACKGROUND AND SUMMARY OF THE INVENTION

This application claims the priority of German Patent Document 100 13 427.0, filed in Germany on Mar. 17, 2000, the disclosure of which is expressly incorporated by reference herein.

The invention relates to a motor-vehicle front end having a front bumper and a front covering mounted behind the front bumper, the front covering mounted pivotably on a load-bearing structural member and in a frontal impact pivoting rearwards about an approximately horizontal vehicle transverse axis by being carried along by the bumper by a rearwards displacement of an associated region of the bumper, a support being provided between a rear supporting surface of the bumper and a mating surface of the front covering for carrying along the front covering.

In German Patent Document DE 27 27 517 A1 a motor-vehicle front end, has already been disclosed, having a headlight which forms a front covering and is mounted pivotably at its lower edge on the associated longitudinal member of the motor vehicle. In a frontal impact, the bumper is displaced rearwards and, after bumping against a buffer of the headlight, carries along the headlight with it, with the result that the latter is pivoted rearwards from its normal position into a deflected position. The headlight is retained in its normal position by spring force and, after having been pivoted, is moved back by this spring force into its normal position. In the case of trivial accidents or a frontal impact at low speed, damage to front coverings, such as headlights or a radiator grille, which are arranged in the front region of a motor vehicle can therefore advantageously be avoided.

In order to enable the headlight or even the radiator grille to be pivoted into the deflected position without any damage, a considerable pivoting clearance for the deflecting movement is required behind them. An appropriately large clearance is not always available in the front-end space of motor vehicles on account of conditions pertaining to the design.

An object of the invention is therefore to develop a front covering of the above type which, at least behind the upper region of the front covering, requires less deflecting space.

According to the invention, the object is achieved by the front covering being mounted pivotably on the load-bearing structural member and in a frontal impact pivoting rearwards about an approximately horizontal vehicle transverse axis by being carried along by the bumper by a rearwards displacement of an associated region of the bumper, a support being provided between a rear supporting surface of the bumper and a mating surface of the front covering for carrying along the front covering, wherein the front covering is suspended in a pendulous manner on the load-bearing structural member at a distance above the bumper and in a lower region is fastened permanently to the supporting surface of the bumper by the mating surface.

The design according to the invention means that, when the bumper moves rearwards, only that region of the front covering which is located below the pivoting axis is carried along rearwards by the bumper. If the front covering protrudes upwards with regard to the swivel axis, that region of the front covering which is located above the pivot axis is pivoted forwards, i.e. out of the front-end space. This means that a deflecting space is not required in the upper region behind the front covering. Depending on design requirements, the position of the swivel axis with regard to the distance from the bumper may be varied. The nearer the swivel axis is shifted towards the bumper, the less deflecting space is required in the upper region behind the front covering.

Advantageous refinements of the invention can be gathered from the remaining claims.

In order to permanently fasten the front covering to the bumper, a central fastening point is preferably provided in the center of the front covering, as a result of which a relatively uniform introduction of the pivoting force into the front covering can be achieved.

If the front end of the motor vehicle has an arrow shape, as seen in plan view, and the front covering is a centrally arranged radiator grille, in a frontal impact the central part of the bumper is generally first of all struck and pushed rearwards against a mating surface running transversely to the longitudinal axis of the vehicle. In order to enable the front covering to be deflected as this happens without a delay, the fastening point in this case is provided in the center of the radiator grille and of the bumper.

The front covering is fastened to the bumper preferably via an easily releasable screw connection or, alternatively, via a releasable clip connection or an expanding rivet connection.

So as not to have to provide a continuous hinge axis for the mounting of the front covering, the front covering is advantageously mounted in a manner allowing it to swivel by way of two lateral bearing journals.

Depending on design conditions in each case, the bearing journals are preferably arranged in the upper region or approximately in the central region of the front covering forming a radiator grille. The receivers into which the bearing journals are fitted are attached to a load-bearing structural member and are therefore fixed in position with regard to the bumper as it is moved rearwards.

An inner part of the bumper, which is fastened to the transverse member of the bumper, can advantageously be used as the load-bearing structural member. For this purpose, a sheet-metal part is placed onto the transverse member and is connected to an angular inner part of the bumper. The receivers, which extend in the longitudinal direction of the vehicle, are formed integrally on the inner part.

To ease insertion of the front covering during assembly, each receivers is of U-shaped design. The limbs, which point counter to the direction of travel, form an introductory opening for the bearing journal. The introductory opening is of slightly narrower design than the diameter of the bearing journal, with the result that, when the bearing journal is introduced, the said opening is temporarily expanded. When the bearing journal is installed, the introductory opening is additionally secured by way of a clasp which is pushed on in the transverse direction of the vehicle. In the process, the limbs of the introductory opening are pressed together and rattling noises and relative movements are therefore suppressed.

Furthermore, the bearing journals may be designed as sleeve bodies, which facilitates the injection-moulding thereof onto the front covering. The sleeve bodies may also be weakened in their end region by, for example, diametrically arranged longitudinal slots. The longitudinal slots facilitate the transverse advance of the bearing journals into the receivers assigned to them, since the end regions can be slightly deflected radially.

In order to provide an effective support for the radiator grille, "detachable" supporting connections are provided between the bumper and radiator grille to the side of the permanent fastening, which supporting connections easily release the connection in the event of frontally acting forces so as not to obstruct the uniform introduction of the pivoting force into the radiator grille.

These "detachable" supporting connections are particularly important for the technical function if the front covering interacts with a reversibly deformable bumper shroud.

A preferred embodiment of the invention is described below with reference to the drawing.

Other objects, advantages and novel features of the present invention will become apparent from the following detailed description of the invention when considered in conjunction with the accompanying drawings.

DETAILED DESCRIPTION OF THE DRAWINGS

Figure 1:
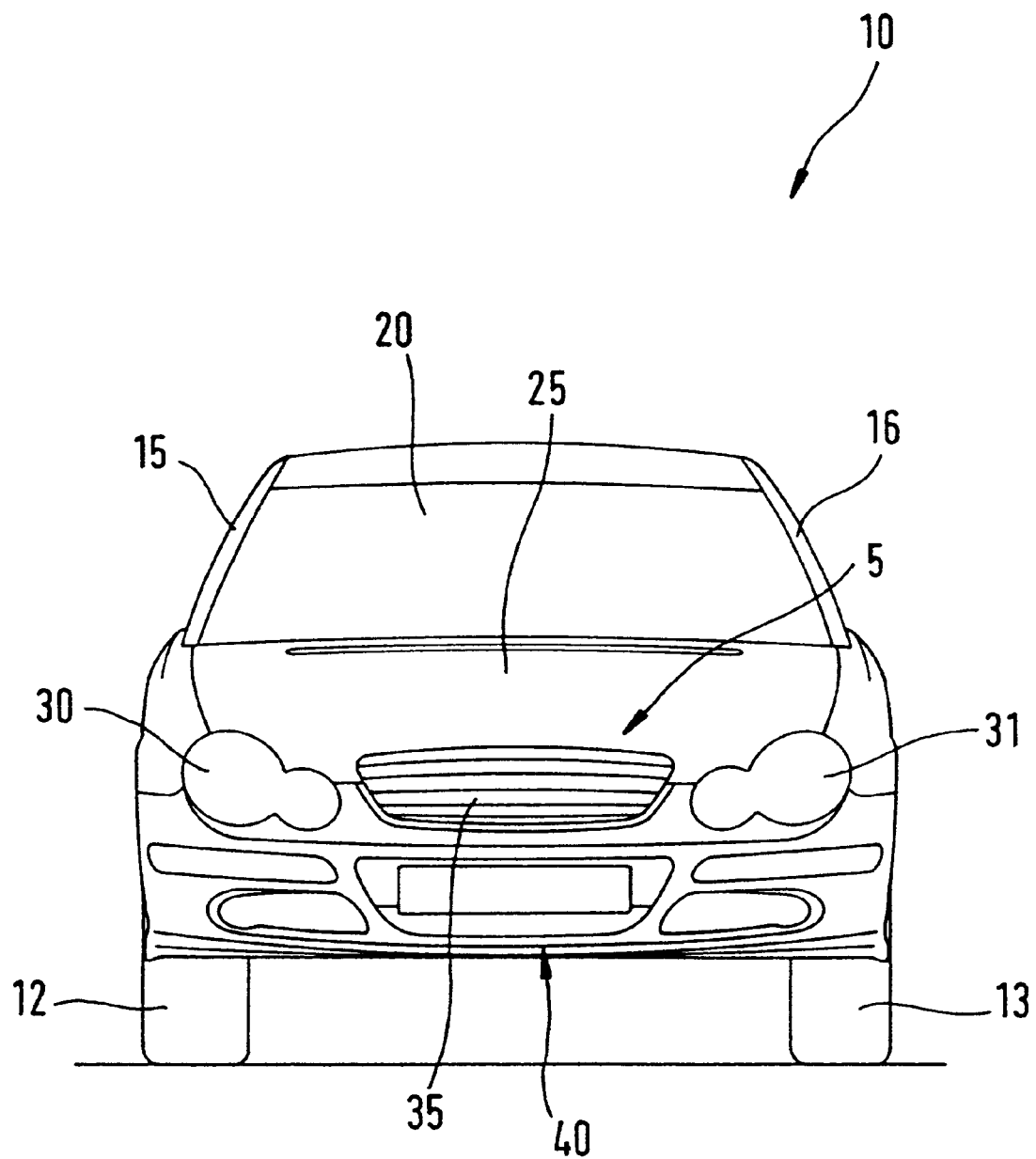
FIG. 1 shows a front view of a motor vehicle.

FIG. 1 shows a motor-vehicle front end 5 of a motor vehicle 10 in a view from the front with two front wheels 12 and 13, a windscreen 20, which is arranged between the A-pillars 15 and 16, and an engine bonnet 25 which is coupled below the windscreen 20. A radiator grille 35 is situated below the engine bonnet 25 between two light units 30 and 31 arranged on the outsides.

The radiator grille 35 is fixed in a bumper unit 40, which is predominantly situated below the radiator grille 35, with the result that the radiator grille 35 is held in a fixed position when the engine bonnet 25 is opened. However, the bumper unit 40 and radiator grille 35 form structural elements which are separated from each other.

Figure 2:
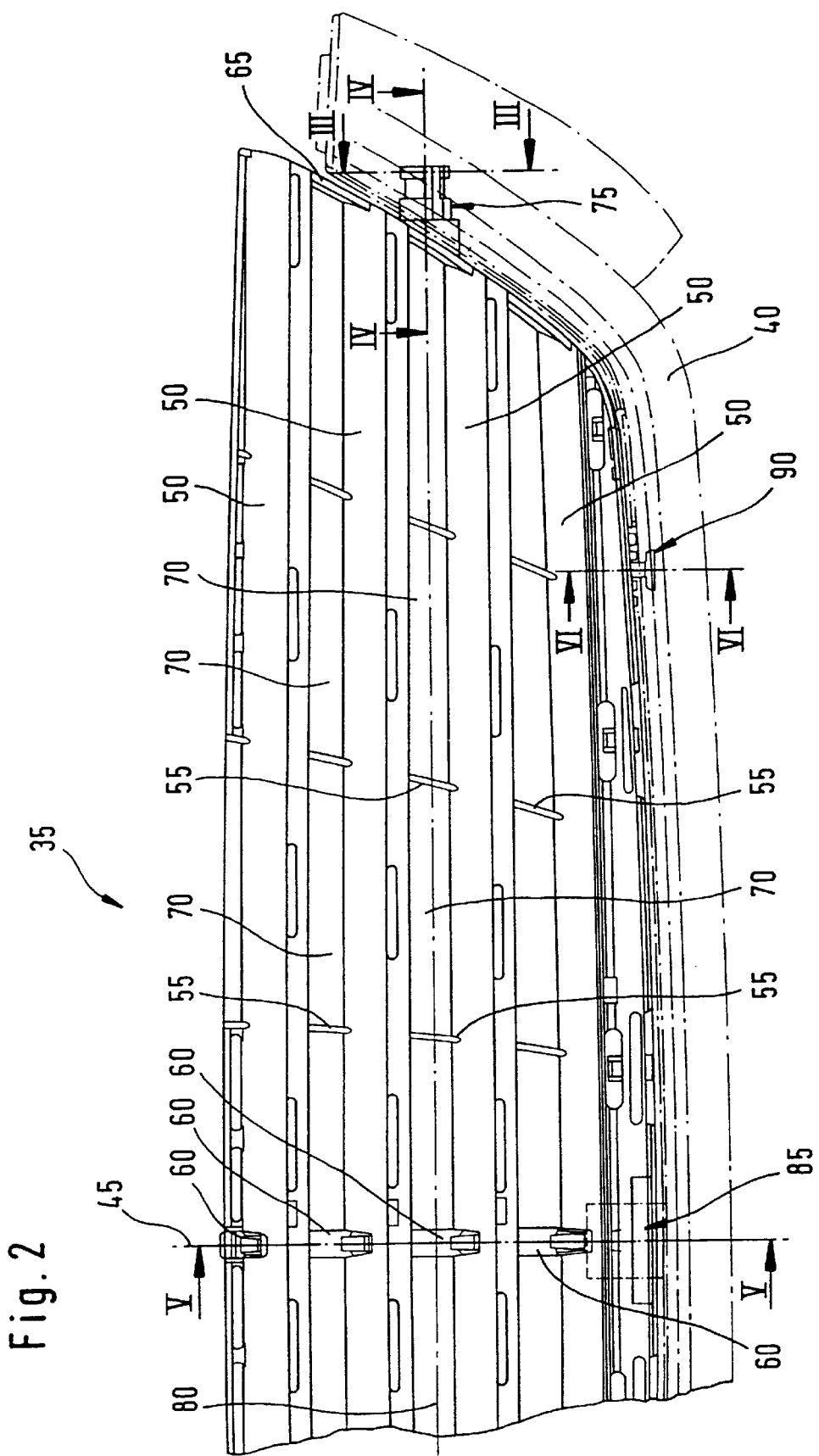
FIG. 2 shows a front view of a radiator grille region of the motor vehicle.

FIG. 2 shows the left-hand region of the grid-like radiator grille 35 in a view from the front. Since the radiator grille 35, which is preferably formed as an extruded plastic grid, is constructed in a mirror-inverted manner with regard to the vertical axis 45 of the vehicle, the following statements can be applied to the right-hand side—only part of which is illustrated here—of the radiator grille 35. The radiator grille 35 is constructed from horizontally arranged bars 50 which extend over the entire width of the radiator grille. The bars 50 are spaced apart from one another by way of ribs 55 and spacers 60 and are retained by way of a frame 65. This produces between the bars 50 approximately rectangular openings 70 for the passage of air into the engine compartment which is situated behind the radiator grille 35.

The pendulous suspension of the radiator grille 35 takes place via bearing sleeves 75 which are injection-moulded onto the frame 65 on both sides and define by way of their mirror-inverted arrangement a geometrical axis which is denoted by the reference number 80.

A fastening point 85, which is arranged in the center of the lower region of the radiator grille 35, ensures that the radiator grille 35 and bumper unit 40 are permanently connected. Arranged on both sides of the permanent fastening point 85, in each case at a lateral distance, is a T-shaped detaching element 90.

The detailed construction and the functioning of the characteristic structural elements is explained below with reference to the sectional illustrations following the sectional lines in FIG. 2.

Figure 3:
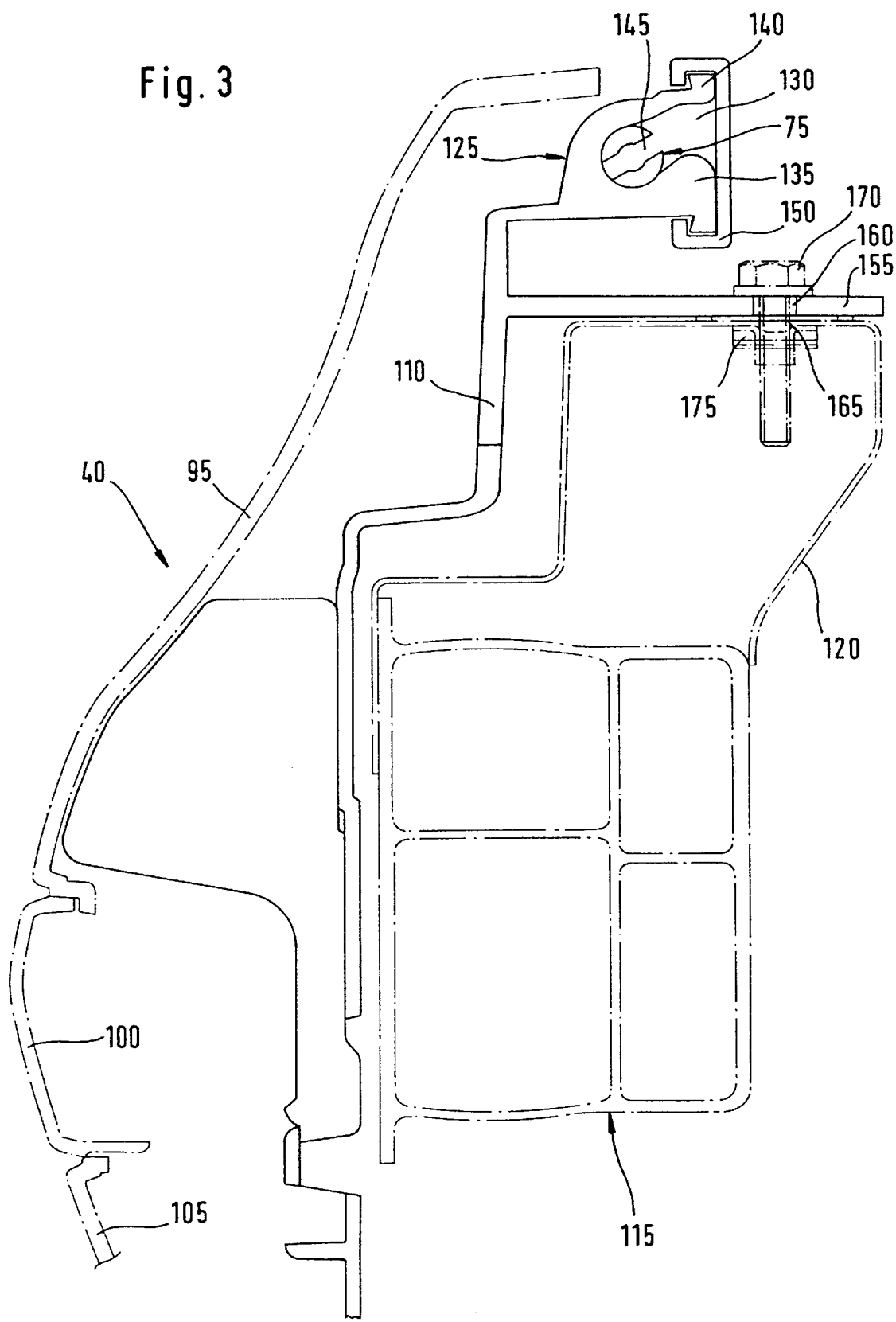
FIG. 3 shows a sectional illustration in accordance with the line III—III in FIG. 2.
Figure 4:
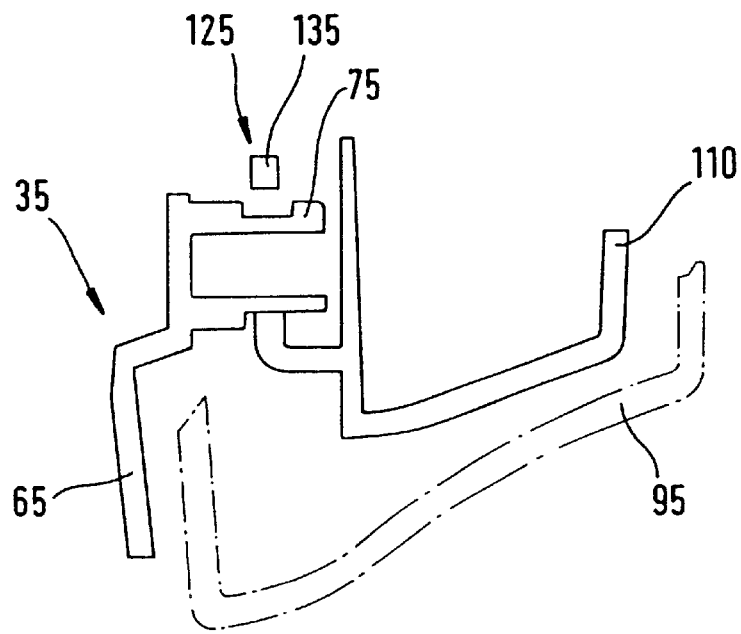
FIG. 4 shows a sectional illustration in accordance with the line IV—IV in FIG. 2.

FIGS. 3 and 4 show the left-hand bearing point for the suspension of the radiator grille 35 in a longitudinal and cross-sectional illustration.

The bumper unit 40 bounds the motor-vehicle front end 5 at the front and comprises a shroud part 95, a bumper 100, a protective strip 105 and an inner part 110. Situated directly behind the bumper unit 40 is a transverse member 115 with a welded-on sheet-metal part 120 placed onto its upper side.

The bearing sleeve 75 is mounted in a U-shaped receiving means 125 which is formed integrally onto the inner part 110 of the bumper unit 40 in the upper region thereof. The receiving means 125 has two limbs 135 and 140 which form an introductory opening 130 and point counter to the direction of travel. For deflection of the bearing sleeve 75 in the receivers 125, the introductory opening 130 is of tapered design and the bearing sleeve 75 is provided with a diametrically arranged longitudinal slot 145. A C-shaped clasp 150 secures the position of the bearing sleeves 75 in the receivers 125 and is pushed with respect thereto in the transverse direction of the vehicle onto the limbs 135 and 140 formed in an angled manner on the ends of the receivers.

The inner part 110, which is preferably manufactured as a plastic part, is of step-shaped design and has a rearwardly pointing, horizontal flange 155 resting flat on the sheet-metal part 120. The flange 155 is provided with a hole 160 which is aligned with a hole 165 in the sheet-metal part 120 with the result that a fixed connection between the load-bearing structural member (transverse member 115) and bearing point (receivers 125) is created with a screw 170 and a welding nut 175.

The step-shaped configuration of the inner part 110 and the slight spacing from the transverse member 115 in the lower region of the inner part 110 makes possible a flexible construction which can be deflected when subjected to slight, frontally acting forces without leading to damage.

Figure 5:
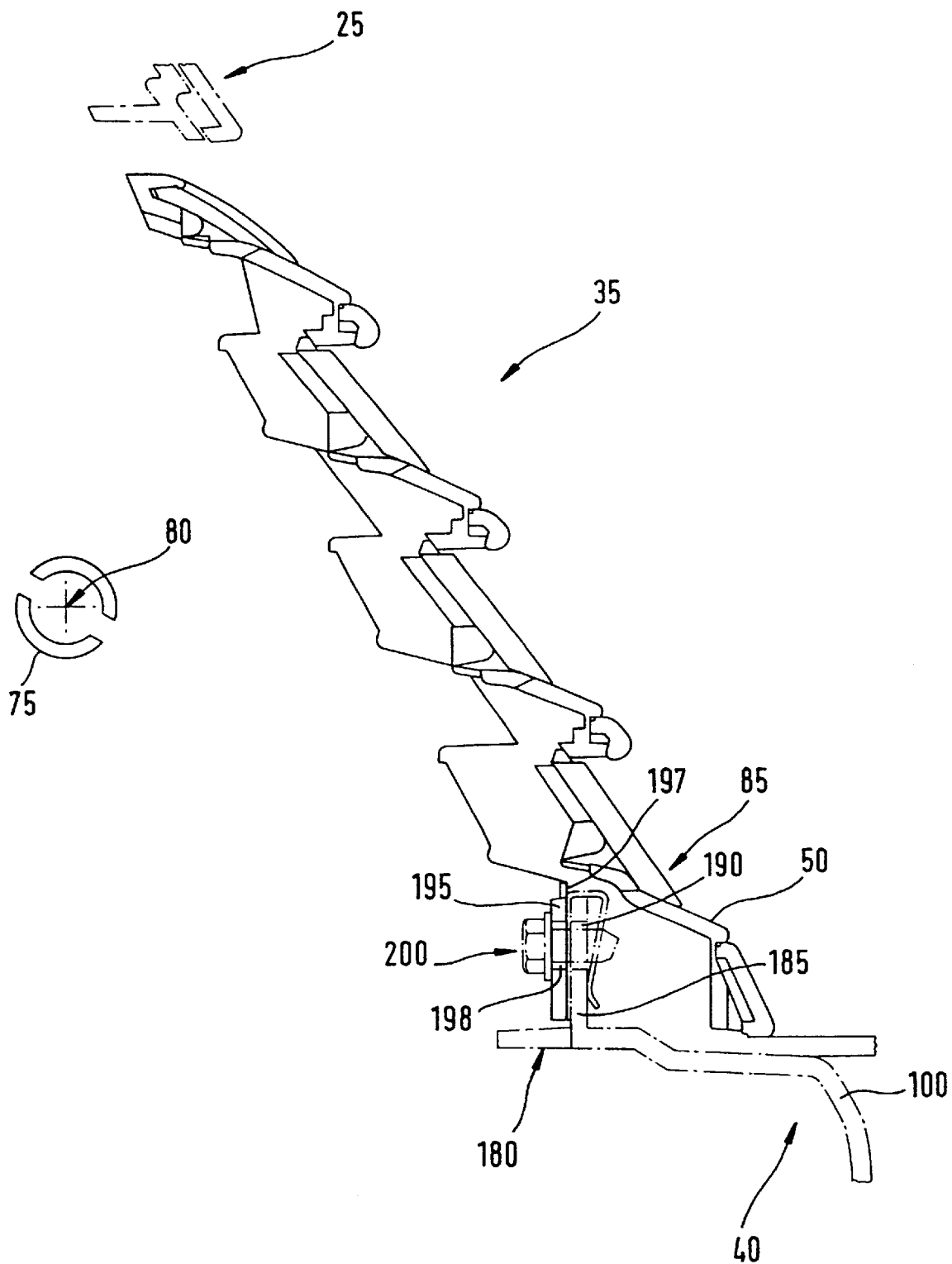
FIG. 5 shows a sectional illustration in accordance with the line V—V in FIG. 2.

In order to illustrate the permanent fastening point 85, which is illustrated in section in FIG. 5, the axis 80, which extends perpendicularly with respect to the plane of projection, is also drawn in. As already described in FIG. 1, the radiator grille 35 is bounded upwards by the engine bonnet 25 and downwards by the bumper unit 40 which supports it. A vertical web 185 which has a hole 190 is provided on the upper rear edge 180 of the bumper 100. The radiator grille 35 is provided with a downwardly protruding tab 195 which is formed integrally on the rear edge 197 of the lowermost bar 50 corresponding to the vertical web 185 and likewise has a hole 198. A connection which is readily accessible from the engine compartment and is rapidly releasable between the radiator grille 35 and bumper 100 is produced by a screw connection 200 comprising a sheet-metal screw and sheet-metal nut.

Figure 6:
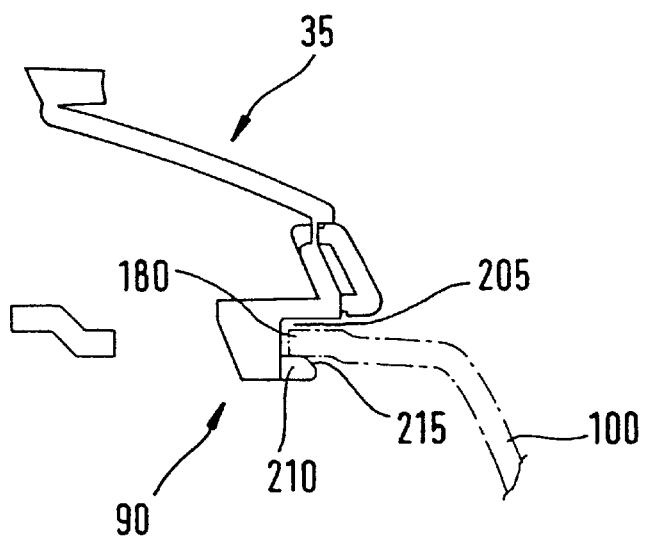
FIG. 6 shows a sectional illustration in accordance with the line VI—VI in FIG. 2.

A further view of the invention is illustrated in FIG. 6. The left-hand, T-shaped detaching element 90 is injection-molded in the shape of a hook (in its side view) onto the radiator grille 35, the upper rear edge 180 of the bumper 100 engaging in the opening 205 thereof. The free limb 210 of the detaching element 90 has a bevel 215 directed towards the opening 205.

Thus, on the one hand, the radiator grille 35 can immediately be deflected, even in the event of a laterally offset impact against the bumper in which the permanent fastening point is not directly acted upon, since the upper rear edge 180 of the bumper 100 carries along the radiator grille 35 and thereby deflects it. On the other hand, in the event of a central impact, the detaching element 90 is pivoted away from the engagement region of the bumper 100, with the result that the radiator grille 35 cannot be excessively deformed.

The advantageous functioning of the invention will now be explained in more detail by reference to the above-described designs according to FIGS. 1 to 6.

In a front impact of the motor vehicle 10 against an obstacle extending in the transverse direction of the vehicle, in particular in the event of the motor-vehicle front end 5 having a narrow shape, first of all the central region of the bumper unit 40 is pressed in. The permanent fastening point 85 is therefore likewise moved rearwards thereby and the radiator grille 35 is thus deflected about the swivel axis 80. At the same time, the deflection of the permanent fastening point 85 causes the detaching elements 90 to be carried along rearwards, with the result that, before the bumper 100 is pressed in this region, the detaching elements 90 are pivoted out of the engagement region of the upper rear edge 180 of the bumper 100. In trivial accidents or an impact at low speeds, damage, particularly in the case of a wide radiator grille 35, can therefore be prevented. Provided that the bumper unit 40 has been deformed reversibly, as the bumper 100 is being reset, the fastening point 85 and therefore the entire radiator grille 35 are also moved back at the same time. Accordingly, the detaching elements 90 move towards the rear edge 180 of the bumper 100. The bevel 215 on the free limb 210 enables the detaching element 90 to slide off along the rear edge 180 of the bumper 100, with the result that the detaching element snaps automatically into its original position.

In order to install the radiator grille 35 in the bumper unit 40, the radiator grille 35 is brought approximately parallel to its subsequent installed position from the rear onto the installation opening, so that first of all the lower side of the radiator grille 35 bears against the rear edge 180 of the bumper 100. The detaching elements 90 snap in along the rear edge 180 of the bumper 100. The bearing sleeves 75 are then pressed into the introductory openings 130 and secured by the clasp 150, with the result that the permanent fastening point 85 has just to be secured via the screw connection 200.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Motor-vehicle front end having a front bumper and a front covering which is mounted behind the front bumper, the front covering being mounted pivotably on a load-bearing structural member and in a frontal impact pivoting rearwards about an approximately horizontal vehicle transverse axis by being carried along by the bumper by a rearwards displacement of an associated region of the bumper, a support being provided between a rear supporting surface of the bumper and a mating surface of the front covering for carrying along the front covering, wherein the front covering is suspended in a pendulous manner on the load-bearing structural member at a distance above the bumper and in a lower region is fastened permanently to the supporting surface of the bumper by the mating surface.

2. Motor-vehicle front end according to claim 1, wherein the mating surface of the front covering is arranged in the center of a lower side of the front covering and is fastened to the supporting surface of the bumper.

3. Motor-vehicle front end according to claim 2, wherein the supporting surface of the bumper is designed as an upwardly protruding retaining profile and the mating surface of the front covering is designed as a tab covering the retaining profile, the tab being fastened to the retaining profile via a screw connection.

4. Motor-vehicle front end according to claim 1, wherein the front covering, is arranged in the center of the motor-vehicle front end and has a bearing journal on each lateral edge, the bearing journals being arranged in a mirror-inverted manner with respect to one another in a vehicle central plane and engaging in a respectively associated receiver of the load-bearing structural member.

5. Motor-vehicle front end according to claim 4, wherein the receivers are integrated in an inner part of the bumper by which the receivers are fastened to a transverse member of the bumper.

6. Motor-vehicle front end according to claim 4, wherein each of the receivers has an elongated introductory opening for the associated bearing journal, the opening extending in a longitudinal direction of the vehicle and being closed by an associated clasp when the bearing journal is installed.

7. Motor-vehicle front end according to claim 6, wherein the bearing journals extend in a transverse direction of the vehicle and are formed with a slot in a longitudinal direction.

8. Motor-vehicle front end according to claim 7, wherein the bearing journals are sleeve bodies formed integrally with the front covering.

9. Motor-vehicle front end according to claim 2, wherein detaching elements are provided which are supported on the lower side of the front covering to a side of the central fastening point and a rear edge of the bumper engages therein.

10. Motor-vehicle front end according to claim 9, wherein at least two detaching elements are arranged at the same lateral distance on both sides of the central fastening point.

11. Motor-vehicle front end according to claim 1, wherein the bumper includes a reversibly deformable bumper shroud which has the supporting surface for the front covering.

12. A method of making a vehicle front end having a front bumper, comprising:

mounting a front covering behind the front bumper pivotably on a load bearing structural member whereby, in a frontal impact, the front covering pivots rearwards about an approximately horizontal vehicle transverse axis by being carried along by the bumper by a rearwards displacement of an associated region of the bumper, and providing a support between a rear supporting surface of the bumper and a mating surface of the front covering for carrying along the front covering, wherein the front covering is suspended in a pendulous manner on the load-bearing structural member at a distance above the bumper and in a lower region is fastened permanently to the supporting surface of the bumper by the mating surface.

13. A method according to claim 12, wherein the front covering is arranged in the center of the motor-vehicle front end and has a bearing journal on each lateral edge, the bearing journals being arranged in a mirror-inverted manner with respect to one another in a vehicle central plane and engaging in a respectively associated receiver of the load-bearing structural member.

14. A vehicle grille assembly comprising:
- a front covering mounted behind a front bumper and pivotably on a load-bearing structural member thereby, in a frontal impact, pivoting rearwards about an approximately horizontal vehicle transverse axis carried along by a rearward displacement of an associated region of the bumper, and
- a support provided between a rear supporting surface of the bumper and a mating surface of the front covering for carrying along the front covering, wherein the front covering is suspended in a pendulous manner on the load-bearing structural member at a distance above the bumper and in a lower region is fastened permanently to the supporting surface of the bumper by the mating surface.

15. A vehicle grille assembly according to claim 14, wherein the mating surface of the front covering is arranged in the center of a lower side of the front covering and is fastened to an opposite supporting surface of the bumper.

16. A vehicle grille assembly according to claim 15, wherein the supporting surface of the bumper is designed as an upwardly protruding retaining profile and the mating surface of the front covering is designed as a tab covering the retaining profile, the tab being fastened to the retaining profile via a screw connection.

17. A vehicle grille assembly according to claim 14, wherein the front covering is arranged in the center of the motor-vehicle front end and has a bearing journal on each lateral edge, the bearing journals being arranged in a mirror-inverted manner with respect to one another in a vehicle central plane and engaging in a respectively associated receiver of the load-bearing structural member.

* * * * *